United States Patent Office 2,766,281
Patented Oct. 9, 1956

2,766,281

PREPARATION OF PHTHALIC ACIDS

Ferdinand B. Zienty, Brentwood, and Marshall C. Freerks, Kirkwood, Mo., assignors to Monsanto Chemical Company, St. Louis, Mo., a corporation of Delaware No Drawing. Application November 20, 1952,
Serial No. 321,744

20 Claims. (Cl. 260—524)

This invention relates to the oxidation of alkyl side chains on an aromatic nucleus and more specifically pertains to an improved process for the oxidation of each of the methyl groups of xylenes to carboxy groups.

Heretofore it has been proposed that toluic acids be prepared by the oxidation of xylenes with nitric acid under various reaction conditions according to the processes employed to oxidize toluene to benzoic acid. However, no commercially acceptable process for the oxidation of toluic acids to phthalic acids has been heretofore described.

When a xylene and nitric acid are heated together at atmospheric pressure the nature of the resulting reaction is dependent upon the concentration of the nitric acid employed. When an excess of nitric acid of a concentration of 50% or less is heated with xylene at atmospheric pressure a constant boiling mixture of xylene and water is formed, boiling at about 90° C. Thus, when these conditions are employed in an attempt to oxidize xylene, the constant boiling mixture imposes a limitation upon the reaction temperature and causes the oxidation of xylene to toluic acid to proceed very slowly. When toluic acid and dilute or concentrated nitric acid are heated together at atmospheric pressure, the maximum reaction temperature obtainable is limited to the boiling point of the particular nitric acid composition employed which in any case is too low to accomplish the oxidation of toluic acid to phthalic acid.

Other methods which have been employed in oxidizing toluic acids to phthalic acids comprise employing permanganates and dichromates as the oxidizing agents. These processes have not as yet been found to be acceptable for industrial practice.

Furthermore, even though toluic acids have been prepared by other methods, it has been virtually impossible to further oxidize the toluic acids to phthalic acids with nitric acid at atmospheric pressure. This is especially true in the case of p-toluic acid. For example, p-toluic acid can be refluxed with nitric acid with a concentration as high as 70% at atmospheric pressure for days and still there will be no detectable quantity of terephthalic acid in the reaction medium.

In our co-pending application Serial No. 321,743, filed November 20, 1952, there is disclosed an acceptable commercial process for oxidizing a xylene to a phthalic acid at atmospheric pressure by the method comprising slowly adding nitric acid to xylene at or near its boiling point while removing water until all the xylene is oxidized to toluic acid, increasing the reaction temperature to maintain the toluic acid molten, and continuing the slow addition of nitric acid and the removal of water. As therein stated, the second oxidation step progresses only until about 25 percent of the toluic acid has been oxidized, at which time the reaction mixture solidifies and becomes unmanageable. It is readily apparent that this process represents a substantial improvement over the processes heretofore proposed.

It has now been discovered that yields of phthalic acid, especially terephthalic acid, of from 80% to 100% can be obtained by the oxidation of toluic acids at atmospheric pressure with nitric acid. This substantial improvement over the process described in the co-pending application referred to above is accomplished by the slow addition of nitric acid to toluic acid in an inert organic medium which is liqud at the temperature at which the reaction is carried out while removing water. This process is carried out at a temperature of from 140° C. up to the decomposition temperature of the reaction medium and preferably at a temperature of from 140° C. to about 200° C.

The inert organic medium need not be added after the xylene has been oxidized to the corresponding toluic acid. Rather, it can be added to the xylene and thereby simplifying the procedural steps. The presence of the inert organic medium has no deleterious effect on the first oxidation step. However, the benefits of the use of the inert organic medium are most pronounced in the second oxidation step. Under such conditions, the reaction medium remains fluid throughout the entire reaction and p-toluic acid can be oxidized to terephthalic acid at atmospheric pressure by this refinement of the process of this invention in yields as high as 80% to substantially 100%. Furthermore, the phthalic acids can be recovered from the inert organic medium by simple processes.

The preparation of phthalic acids from xylenes according to the process of this invention consists in heating a mixture of xylene and an inert organic medium which is a liquid at the reaction temperature to a temperature above 100° C., and more advantageously from about 120° C. to approximately the boiling point of the xylene, and slowly adding nitric acid to the hot mixture while removing water by distillation thereby forming a mixture containing a toluic acid. This toluic acid mixture is heated to a temperature greater than 140° C. but below the decomposition point of the reaction mixture while continuing the slow addition of the nitric acid and removal of water by distillation until the oxidation ceases. In this manner, a phthalic acid is formed in admixture with the inert organic medium. The phthalic acid can then be recovered in any suitable manner.

In both steps of the novel process of this invention nitric acid is slowly added to the reactor. This slow addition can be accomplished in any one of several ways. For example, the nitric acid can be added dropwise, in a slow steady stream, an intermittent stream or as regularly injected portions throughout the reaction. In any case, the rate of addition of nitric acid should not substantially exceed its rate of consumption. To eliminate the accumulation of hot nitric acid in the reaction equipment, the dropwise and slow stream addition of nitric acid are preferred. By adding the nitric acid at a rate substantially equal to its rate of consumption, the first step will require approximately two moles of nitric acid per mole of xylene charged and the second step will require two moles per mole of toluic acid oxidized. Of course, an amount of nitric acid in excess of two moles per mole of reactant converted can be employed in either step, but such a practice obviously would offer no significant advantage since the excess nitric acid would have to be removed from the reaction equipment and be recovered.

The concentration of nitric acid which can be employed in the process of this invention can be varied substantially. Aqueous nitric acid solutions which can be successfully used in this process range from those containing from about 30% by weight of nitric acid to those containing as much as about 70% by weight of nitric acid which is above the usual oxidizing concentrations and border on the nitrating concentrations of nitric acid. Even when 70% nitric acid is employed, nitration products are not formed in either step of the process.

During both steps of the process of this invention water is removed from the reaction by distillation. This water removed includes the water added with the aqueous nitric acid and the water formed during the oxidation process. Consequently, it is advantageous to employ the most concentrated nitric acid solutions so that the water can be removed as rapidly as possible. The slow addition of nitric acid with the almost instantaneous reaction in each step facilitates the rapid removal of water. The intermittent addition of nitric acid provides for a temporary accumulation of water which will, of course, retard temporarily the oxidation in either step. However, even under these conditions, p-toluic acid can be oxidized to terephthalic acid at atmospheric pressure.

The following specific examples are presented to illustrate the process of this invention and are not intended as a limitation thereon.

*Example I*

100 ml. of p-xylene and 100 g. of mineral oil are charged to a three-necked 500 ml. flask fitted with an efficient stirrer, a fractionating column and a separator with a top return feed to the reaction vessel. A vent line is connected with a scrubber to absorb the oxides of nitrogen. While maintaining a temperature in the reaction mixture in the range of from about 120° C. to about 130° C., 127 ml. of 70% nitric acid is added over a period of three hours, after which time substantially all of the xylene has been converted to p-toluic acid.

The temperature of the reaction mixture is then raised to about 170°–180° C. and 70% nitric acid is added dropwise. The oxidation reaction takes place substantially instantaneously as each drop of acid hits the hot surface. There is no evidence of accumulation of nitric acid in the reaction system during the reaction. However, as soon as all the toluic acid has been converted to phthalic acid or the reaction ceases, nitric acid vapors do accumulate. The endpoint of the reaction is, therefore, readily determined by this process. After four hours of dropwise addition of nitric acid, 183 ml. of acid had been consumed. During the addition of the acid, the quantity of aqueous condensate recovered is substantially equal to the sum of the water added with the acid and the water formed during the reaction. A small quantity of nitric acid is also collected with the water. By following the change in density of the distillate, the efficiency of the oxidation can be obtained and the end point of the reaction can be determined.

The terephthalic acid which is formed in the above process separates as a solid material converting the reaction mixture into a slurry. The mineral oil is removed from the reaction mixture and an excellent yield of substantially pure terephthalic acid recovered.

*Example II*

The procedure set forth in Example I is repeated utilizing a chlorinated diphenyl having a chlorine content of 48% by weight in place of the mineral oil. An excellent yield of terephthalic acid is produced.

*Example III*

100 ml. of p-xylene and 100 g. of benzoic acid are charged to a three-necked 500 ml. flask fiitted with an efficient stirrer, a fractionating column and a separator with a top return feed to the reaction vessel. A vent line is connected with a scrubber to remove the oxides of nitrogen. While maintaining a temperature in the reaction mixture in the range of from about 120° C. to about 130° C., 127 ml. of 70% nitric acid is slowly added by a continuous dropwise addition over a period of three hours, after which time substantially all of the xylene has been converted to p-toluic acid.

The temperature of the reaction mixture is then raised to about 170°–180° C. and 183 ml. of 70% nitric acid is added by dropwise addition over a period of about four hours. The terephthalic acid which is thereby formed separates as a solid material converting the reaction mixture into a slurry.

The reaction mass thus obtained is then cooled to 95°–100° C. and 50 ml. of water added. 25 ml. of distillate is taken forward in order to clear the reaction mixture of nitric acid. 200 ml. of water is then added and the slurry heated to boiling for a period of about 15 minutes in order to dissolve the benzoic acid. The solid material remaining is recovered from the aqueous mixture by filtration and dried. The dried solid product recovered assayed 90% terephthalic acid and 10% p-toluic acid.

By following the procedure set forth in Example III, terephthalic acid can be obtained in yields of 90% or higher based on the xylene charged.

*Example IV*

100 ml. of p-xylene and 100 g. of ortho-phthalic anhydride are charged to a three-necked, 500 ml. flask fitted with an efficient stirrer, a fractionating column and a separator with a top return feed to the reaction vessel. The vent line is connected with a scrubber to remove the oxides of nitrogen. While maintaining a temperature in the reaction mixture in the range of from about 120° C. to about 130° C., 127 ml. of 70% nitric acid is added over a period of three hours, after which time substantially all of the xylene has been converted to p-toluic acid.

The temperature of the reaction mixture is then raised to about 170°–180° C. and 183 ml. of 70% nitric acid added over a period of about four hours. The reaction mixture thus obtained contains an excellent yield of terephthalic acid, based upon the xylene initially charged, contained in phthalic anhydride.

Ortho-xylene, meta-xylene, a mixture of meta- and paraxylenes, or a mixture of all three isomeric xylenes can be employed in the process described in Example III to convert the xylene or mixtures of xylenes to the corresponding phthalic acid or mixtures of phthalic acids.

The following examples illustrate the process of this invention where toluic acid is the starting material and also demonstrate that the process is not limited to a particular source of toluic acid.

*Example V*

113 g. of p-toluic acid and 100 g. of mineral oil are charged into a three-necked, 500 ml. flask fitted with a fractionating column, a separator with a return system, an efficient stirrer and a vent line connected to a scrubber to absorb the lower oxides of nitrogen. The reaction mixture is then heated to a temperature of about 170°–180° C. and acid is added dropwise. As each drop of nitric acid hits the hot surface of the reaction medium, oxidation takes place. During the addition of nitric acid, water and some dilute nitric acid are distilled off and collected. Once equilibrium is established in the fractionating column and condenser, the quantity of the aqueous condensate collected is substantially equal to the sum of the water added with the nitric acid, the water formed by the oxidation reaction and the small amount of unreacted nitric acid. After four hours of uniform, continuous addition of nitric acid, 183 ml. of the acid had been consumed. At no time during the reaction except at the end of the four hour period when reaction had ceased was there an accumulation of nitric acid in the reaction equipment. The terephthalic acid which is thereby formed separates as a solid material converting the reaction mixture into a slurry. The mineral oil when removed from the reaction mixture permits the recovery of substantially pure terephthalic acid.

*Example VI*

When the procedure set forth in Example V is repeated utilizing a chlorinated diphenyl having a chlorine content of 48% by weight in place of the mineral oil, an excellent yield of terephthalic acid will result.

Example VII 113 g. of p-toluic acid and 100 g. of benzoic acid are charged to a three-necked, 500 ml. flask fitted with a fractionating column, a separator with a return system and an efficient stirrer. The reaction mixture is heated to a temperature of about 170°–180° C. and 183 ml. of 70% nitric acid is added uniformly by dropwise addition over a period of about four hours. The terephthalic acid which is thereby formed separates as a solid material, converting the reaction mixture into a slurry. Again the collection of aqueous condensate was substantially equal to the sum of the addition of the water added with the nitric acid and the water formed by the reaction. Also at no time prior to the end of the reaction was there an accumulation of nitric acid in the reaction equipment.

The reaction mass thus obtained is then cooled to 95°–100° C. and 200 ml. of water added and the slurry heated to boiling for a period of about 15 minutes in order to dissolve the benzoic acid. The solid material is recovered from the aqueous mixture by filtration and dried. This dried material assayed 90% terephthalic acid and 10% p-toluic acid.

Example VIII 113 g. of p-toluic acid and 100 g. of ortho-phthalic anhydride are charged into a three-necked, 500 ml. flask fitted with a fractionating column, a separator with a return system and an efficient stirrer. The reaction mixture is then heated to a temperature of about 170°–180° C. and 183 ml. of 70% nitric acid is added slowly and uniformly over a period of about four hours. The reaction mixture thus obtained contains an excellent yield of terephthalic acid, based upon the p-toluic acid charged, contained in phthalic anhydride.

The process described in Example IV can be employed to convert m-toluic acid, a mixture of m-toluic and p-toluic as well as a mixture containing all three isomeric toluic acids to the corresponding phthalic acid or mixtures of phthalic acids.

In carrying out the preferred novel process of this invention, any inert organic medium which is liquid at the temperatures of the reaction may be utilized. The preceding examples have illustrated specific reaction mediums which are particularly advantageous. Additional examples of inert organic reaction mediums which are liquid at the reaction temperatures which may also be utilized are biphenyl, diphenyl ether, etc. Other useful organic compounds will be obvious to those skilled in the art. The quantity of the inert organic reaction medium utilized is subject to substantial variation with the amount employed being determined principally by that amount which is necessary to effect a fluid reaction medium, either by dispersion or solution of the reactants, in order to permit the oxidation reaction to go to completion. After the reaction is complete the phthalic acid may be recovered from the reaction mixture in any convenient manner.

Also in the preceding examples the addition of the nitric acid was dropwise. However, a slow continuous stream of nitric acid can be employed when the reaction is carried out at temperatures of 200° C. and above. Under these conditions the rate of oxidation can be substantially increased.

While the preceding examples have illustrated specific embodiments of the novel improved process of this invention, it will be obvious to those skilled in the art that substantial variations in the quantities of reactants and process conditions set forth in these examples is possible without departing from the scope of this invention. In carrying out the novel process of this invention, the reaction temperature of the first step should be maintained at a temperature at or near the boiling point of the reaction medium. In the second step, the reaction temperature should be equal to or greater than the melting point of the particular mixture of toluic acid and inert organic medium. Temperatures greater than about 140° C. are particularly preferred in the second step. Temperatures as high as the boiling point or decomposition point of the particular reaction mixture may also be utilized in carrying out the novel process of this invention.

This application is a continuation-in-part of co-pending applications Serial No. 228,741, Serial No. 228,742, Serial No. 228,743 and Serial No. 228,744 all filed May 28, 1951, all now abandoned.

What is claimed is:

1. In a process for the preparation of a phthalic acid by the oxidation of a xylene, the steps comprising slowly adding nitric acid to a xylene while maintaining a temperature from about 120° C. to approximately the boiling point of xylene and while removing water by distillation thereby forming a toluic acid, and then slowly adding nitric acid to the toluic acid maintained in a fluid state at a temperature greater than about 140° C. while removing water by distillation, said reactions being carried out at atmospheric pressure in an inert organic medium which is liquid at the reaction temperatures.

2. In a process for the preparation of a phthalic acid by the oxidation of a xylene, the steps comprising slowly adding nitric acid having a concentration of from about 30% to about 70% $HNO_3$ to a xylene while maintaining a temperature at approximately the boiling point of xylene and while removing water by distillation, thereby forming a reaction mixture containing toluic acid, and then slowly adding nitric acid having a concentration of from about 30% to about 70% $HNO_3$ to the reaction mixture at a temperature greater than about 140° C. while removing water by distillation, said reactions being carried out at atmospheric pressure in an inert organic medium which is liquid at the reaction temperatures.

3. The process as described in claim 2 wherein the inert organic medium is benzoic acid.

4. In a process for the preparation of a phthalic acid by the oxidation of a xylene, the steps comprising slowly adding nitric acid having a concentration of from about 30% to about 70% $HNO_3$ to a xylene while maintaining a temperature in the range of from about 120° C. to about the boiling point of the xylene and while removing water by distillation, thereby forming a reaction mixture containing toluic acid, and then slowly adding nitric acid having a concentration of from about 30% to about 70% $HNO_3$ to the reaction mixture at a temperature greater than about 140° C. while removing water by distillation, said reactions being carried out at atmospheric pressure in an inert organic medium which is liquid at the reaction temperatures.

5. In a process for the preparation of terephthalic acid by the oxidation of p-xylene, the steps comprising slowly adding nitric acid having a concentration of from about 30% to about 70% $HNO_3$ to p-xylene dispersed in benzoic acid while maintaining a temperature in the range of from about 120° C. to about the boiling point of the xylene and while removing water by distillation, thereby forming a reaction mixture containing p-toluic acid, and then slowly adding nitric acid having a concentration of from about 30% to about 70% $HNO_3$ to this reaction mixture at atmospheric pressure and at a temperature greater than about 140° C. while removing water by distillation.

6. In a process for the preparation of terephthalic acid by the oxidation of p-xylene, the steps comprising slowly adding nitric acid having a concentration of from about 30% to about 70% $HNO_3$ to p-xylene contained in a halogenated diphenyl while maintaining a temperature in the range of from about 120° C. to about the boiling point of the xylene and while removing water by distillation, thereby forming a reaction mixture containing p-toluic acid, and then slowly adding nitric acid having a concentration of from about 30% to about 70% $HNO_3$ to the reaction mixture at atmospheric pressure and at a temperature greater than about 140° C. while removing water by distillation.

7. In a process for the preparation of terephthalic acid by the oxidation of p-xylene, the steps comprising slowly adding nitric acid having a concentration of from about 30% to about 70% $HNO_3$ to p-xylene contained in mineral oil while maintaining a temperature in the range of from about 120° C. to about the boiling point of the xylene and while removing water by distillation, thereby forming a reaction mixture containing p-toluic acid, and then slowly adding nitric acid having a concentration of from about 30% to about 70% $HNO_3$ to the reaction mixture at atmospheric pressure and at a temperature greater than about 140° C. while removing water by distillation.

8. In a process for the preparation of terephthalic acid by the oxidation of p-xylene, the steps comprising slowly adding nitric acid having a concentration of from about 30% to about 70% $HNO_3$ to p-xylene contained in phthalic anhydride while maintaining a temperature in the range of from about 120° C. to about the boiling point of the xylene and while removing water by distillation, thereby forming a reaction mixture containing p-toluic acid, and then slowly adding nitric acid having a concentration of from about 30% to about 70% $HNO_3$ to the reaction mixture at atmospheric pressure and at a temperature greater than about 140° C. while removing water by distillation.

9. In a process for the preparation of terephthalic acid by the oxidation of p-xylene, the steps comprising adding nitric acid having a concentration of from about 30% to about 70% $HNO_3$ at a rate approximately equal to its rate of consumption to p-xylene dispersed in benzoic acid while maintaining a temperature in the range of from about 120° C. to about the boiling point of the xylene and while removing water by distillation, thereby forming a reaction mixture containing p-toluic acid, and then adding nitric acid having a concentration of from about 30% to about 70% $HNO_3$ at a rate approximately equal to its rate of consumption to the reaction mixture at atmospheric pressure, while maintaining a temperature greater than about 140° C. and while removing water by distillation.

10. In a process for the preparation of a phthalic acid, the step comprising slowly adding nitric acid to a molten toluic acid at atmospheric pressure while removing water by distillation, said reaction being carried out in an inert organic medium which is liquid at the reaction temperature.

11. In a process for the preparation of a phthalic acid, the step comprising slowly adding nitric acid to a toluic acid in a fluid state dispersed in benzoic acid while maintaining a temperature greater than about 140° C. and while removing water by distillation, said reaction being carried out at atmospheric pressure.

12. In a process for the preparation of a phthalic acid, the step comprising slowly adding nitric acid having a concentration of from about 30% to about 70% $HNO_3$ to a molten toluic acid dispersed in benzoic acid while removing water by distillation, said reaction being carried out at atmospheric pressure.

13. In a process for the preparation of a phthalic acid, the step comprising slowly adding nitric acid having a concentration of from about 30% to 70% $HNO_3$ to a molten toluic acid dispersed in benzoic acid while maintaining a temperature greater than about 140° C. and while removing water by distillation, said reaction being carried out at atmospheric pressure.

14. In a process for the preparation of a phthalic acid, the step comprising adding nitric acid having a concentration of from about 30% to about 70% $HNO_3$ at a rate approximately equal to its rate of consumption to a molten toluic acid dispersed in benzoic acid while maintaining a temperature greater than about 140° C. and while removing water by distillation, said reaction being carried out at atmospheric pressure.

15. In a process for the preparation of a phthalic acid, the step comprising adding nitric acid having a concentration of from about 30% to about 70% $HNO_3$ at a rate approximately equal to its rate of consumption, to a molten toluic acid contained in a halogenated diphenyl, while maintaining a temperature greater than about 140° C. at atmospheric pressure and while removing water by distillation.

16. In a process for the preparation of a phthalic acid, the step comprising adding nitric acid having a concentration of from about 30% to about 70% $HNO_3$ at a rate approximately equal to its rate of consumption, to a molten toluic acid contained in mineral oil, while maintaining a temperature greater than about 140° C. at atmospheric pressure and while removing water by distillation.

17. In a process for the preparation of a phthalic acid, the step comprising slowly adding nitric acid having a concentration of from about 30% to about 70% $HNO_3$ to a molten toluic acid contained in phthalic anhydride, while maintaining a temperature greater than about 140° C. at atmospheric pressure and while removing water by distillation.

18. In a process for the preparation of terephthalic acid, the step comprising slowly adding nitric acid having a concentration of from about 30% to about 70% $HNO_3$ to molten p-toluic acid contained in benzoic acid, while maintaining a temperature greater than about 140° C. at atmospheric pressure and while removing water by distillation.

19. In a process for the preparation of terephthalic acid, the step comprising adding nitric acid having a concentration of from about 30% to about 70% $HNO_3$ at a rate approximately equal to its rate of consumption to molten p-toluic acid contained in benzoic acid, while maintaining a temperature greater than about 140° C. at atmospheric pressure and while removing water by distillation.

20. The process for preparing terephthalic acid which comprises adding nitric acid having a concentration of from about 30% to about 70% $HNO_3$ at a rate approximately equal to its rate of consumption to molten p-toluic acid contained in benzoic acid, said process being carried out at a temperature greater than about 140° C. and at atmospheric pressure while removing water by distillation until substantially all of the p-toluic acid has been oxidized, heating the reaction mixture in boiling water to dissolve the benzoic acid to form a slurry of terephthalic acid in the solution, and filtering said slurry to recover the terephthalic acid.

References Cited in the file of this patent

UNITED STATES PATENTS

| | | |
|---|---|---|
| 1,488,730 | Beall et al. | Apr. 1, 1924 |
| 2,636,899 | Burrows et al. | Apr. 28, 1953 |

OTHER REFERENCES

| | | |
|---|---|---|
| 494,439 | Belgium | Mar. 31, 1950 |